US010573033B2

United States Patent
Gupta et al.

(10) Patent No.: US 10,573,033 B2
(45) Date of Patent: Feb. 25, 2020

(54) SELECTIVE EDITING OF BRUSHSTROKES IN A DIGITAL GRAPHICAL IMAGE BASED ON DIRECTION

(71) Applicant: Adobe Inc., San Jose, CA (US)

(72) Inventors: Sourabh Gupta, Uttar Pradesh (IN); Ajay Bedi, Himachal Pradesh (IN)

(73) Assignee: Adobe Inc., San Jose, CA (US)

( * ) Notice: Subject to any disclaimer, the term of this patent is extended or adjusted under 35 U.S.C. 154(b) by 36 days.

(21) Appl. No.: 15/846,884

(22) Filed: Dec. 19, 2017

(65) Prior Publication Data

US 2019/0188886 A1 Jun. 20, 2019

(51) Int. Cl.
*G06T 11/20* (2006.01)
*G06K 9/00* (2006.01)
*G06T 11/60* (2006.01)

(52) U.S. Cl.
CPC ........ *G06T 11/203* (2013.01); *G06K 9/00416* (2013.01); *G06T 11/60* (2013.01); *G06T 2200/24* (2013.01)

(58) Field of Classification Search
None
See application file for complete search history.

(56) References Cited

U.S. PATENT DOCUMENTS

| 9,904,465 | B2 * | 2/2018 | Angelov | G06Q 10/101 |
| 2013/0120248 | A1 * | 5/2013 | Gilra | G06F 3/04812 |
| | | | | 345/157 |
| 2013/0241934 | A1 * | 9/2013 | Norris | G06K 9/00416 |
| | | | | 345/442 |
| 2015/0016725 | A1 * | 1/2015 | Tsutsui | G06K 9/00416 |
| | | | | 382/187 |
| 2015/0139547 | A1 * | 5/2015 | Yamaji | G06K 9/00416 |
| | | | | 382/186 |
| 2015/0169975 | A1 * | 6/2015 | Kienzle | G06K 9/34 |
| | | | | 382/189 |
| 2018/0061093 | A1 * | 3/2018 | Liu | G06T 11/203 |

* cited by examiner

*Primary Examiner* — Ryan M Gray
(74) *Attorney, Agent, or Firm* — Kilpatrick Townsend & Stockton LLP

(57) ABSTRACT

An image editing application selectively edits a brushstroke in an image, based on a direction of the brushstroke. In some cases, the brushstroke is selectively edited based on a similarity between the direction of the brushstroke and a direction of an editing tool. Additionally or alternatively, directional data for each pixel of the brushstroke is compared to directional data for each position of the editing tool. Data structures capable of storing directional information for one or more of a pixel, a brushstroke, or a motion of an editing tool are disclosed.

19 Claims, 6 Drawing Sheets

SELECTIVE EDITING OF BRUSHSTROKES IN A DIGITAL GRAPHICAL IMAGE BASED ON DIRECTION

FIELD OF THE INVENTION

This disclosure relates generally to the field of digital graphical image editing, and more specifically relates to graphical image editing based on brushstroke direction.

BACKGROUND

Image editing applications provide users with tools to create, edit, and manipulate digital graphical images. Editing of digital graphical images has widespread acceptance and is used in multiple roles, including in professional, hobbyist, and amateur contexts. Additionally or alternatively, image editing applications include various editing tools by which a user creates or manipulates a digital graphical image, such as tools for erasing, applying brushstrokes to, modifying colors of, or applying effects to some or all portions of the image. Editing tools affect, for example, portions of an image that are indicated by a user via a cursor, such as by indicating an area with a mouse or with a fingertip on a touchscreen.

In some cases, conventional editing tools edit portions of an image that are indicated by the cursor, such as portions of an image that are overlapped by the cursor. Additionally or alternatively, conventional editing tools edit active portions of an image that are indicated by the cursor, such as portions that are overlapped by the cursor on an active layer of the image. The portion of the image that is affected by the cursor may include all active layers overlapping with the cursor. In some cases, a user applies an editing tool to a targeted brushstroke in an image by moving the cursor in a certain direction, such as a direction similar to the direction of the targeted brushstroke. The cursor may edit the brushstroke having the similar direction. However, the cursor may edit additional portions of the image, such as additional brushstrokes having directions dissimilar to the direction of the cursor. Modifying the cursor (e.g., to have a smaller shape) allows a user to edit a brushstroke with increased precision, but using the modified cursor results in increased time for the user to perform the edits. In addition, an input device associated with the modified cursor, such as a fingertip on a touchscreen, may be imprecise, resulting in mistakes and increasing frustration of the user.

Existing image editing applications include, in some cases, the use of image layers to activate (or deactivate) certain portions of an image that are on active (or inactive) layers. For example, a user applies an editing tool to an active layer that includes a targeted brushstroke to be edited. The editing tool applied to the active layer edits only portions of the image located on the active layer. However, multiple additional brushstrokes located on the active layer are still modified by the editing tool, and brushstrokes other than targeted brushstroke are edited on the active layer. A user may attempt to select a particular brushstroke and move it to a new layer. However, selection techniques may be imprecise when other brushstrokes overlap with the particular brushstroke, and the selection technique may select brushstrokes (or other image portions) other than the particular brushstroke.

Thus, it is desirable to develop techniques by which an editing tool selectively edits a brushstroke having a direction similar to the direction of the editing tool. In addition, it is desirable to develop data structures representing direction information associated with a brushstroke.

SUMMARY

According to certain embodiments, an image editing application receives inputs indicating brushstrokes or editing tools that are applied to a digital graphical image. The image editing application determines a direction of each input, and generates data indicating the direction of the applied brushstroke or editing tool. In some embodiments, the image editing application stores the data indicating the direction of the brushstrokes, and selectively edits a brushstroke based on a comparison of the brushstroke directional data with the editing tool directional data. For example, based on the comparison, the directional data of a particular brushstroke is determined to be similar to the directional data of a particular editing tool that is being applied to the digital graphical image. Based on the determined similarity, the particular brushstroke is edited by the particular editing tool. In some embodiments, additional brushstrokes having additional directional data are unaffected by the particular editing tool, based on a determined dissimilarity of the additional directional data and the directional data of the particular editing tool.

In some embodiments, the directional data is determined and stored for each pixel included in a digital graphical image having a file format based on pixels. For example, a pixel-based digital graphical image is edited in an image editing application by an brushstroke applied to the image. The image editing application determines a set of pixels included in the brushstroke. The image editing application determines graphical information describing the set of pixels, or directional information describing the set of pixels, or both. The image editing application generates (or modifies) a data structure and stores in the data structure the graphical information and directional information associated with each pixel. In some embodiments, the image editing application compares the stored directional information to directional information describing an applied editing tool, for example, to determine a similarity between the editing tool directional data and the stored directional data describing the set of pixels. Based on the comparison, the image editing application modifies the data structure, such as by editing the set of pixels having directional data similar to the editing tool directional data.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

Figure 1:
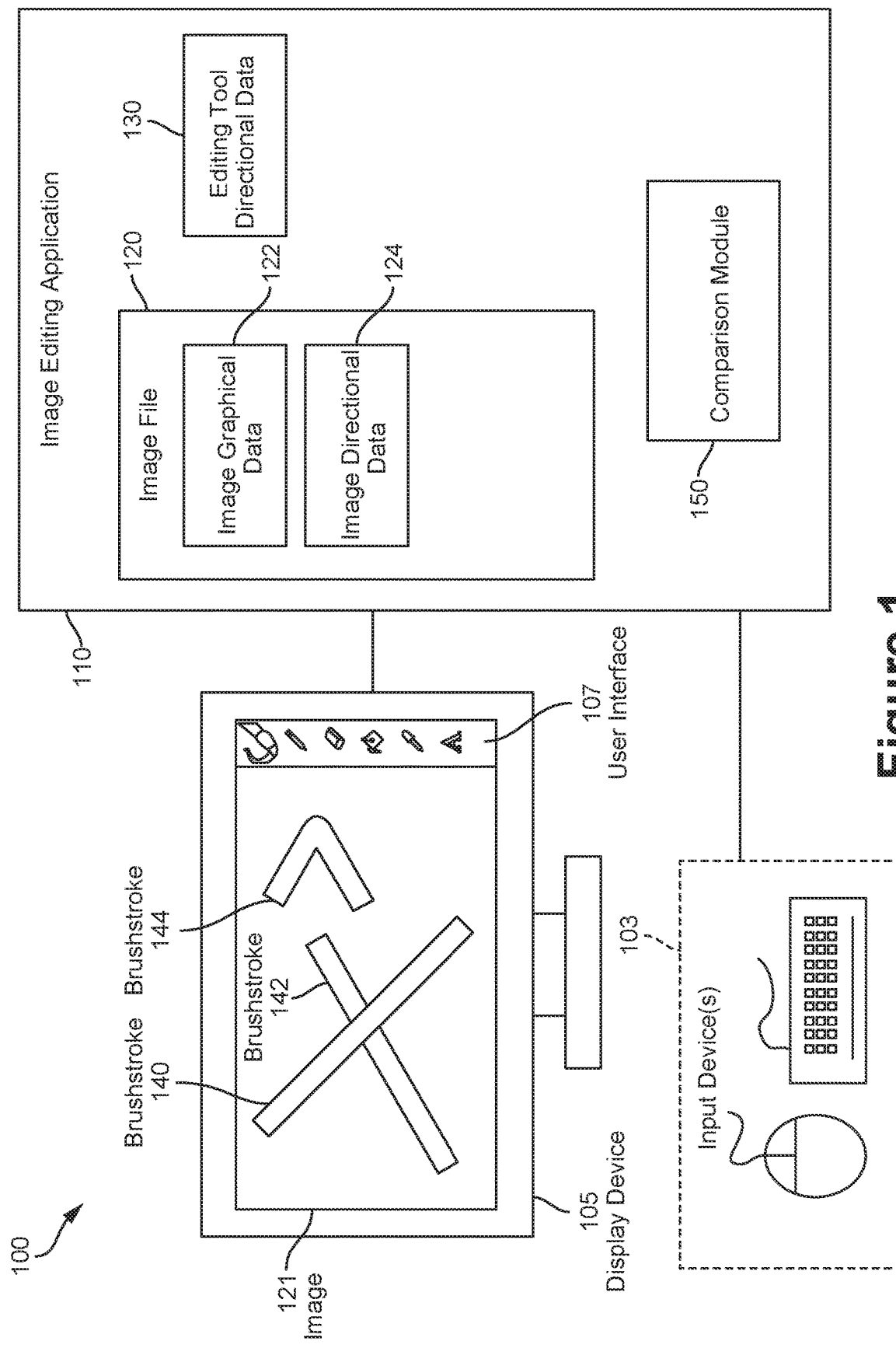
FIG. 1 is a block diagram depicting an example of an image editing application for selectively editing brushstrokes in a digital graphical image, according to certain embodiments.

As discussed above, prior techniques for editing digital graphical images do not provide for selective editing of brushstrokes based on directional information or data structures for storing directional information associated with pixels of an image. Certain embodiments described herein provide for selective editing of brushstrokes or other portions of an image based on directional information describing the brushstrokes or image portions. Additionally or alternatively, certain embodiments described herein provide for generating or modifying data structures capable of storing directional information associated with individual pixels of an image.

The following examples are provided to introduce certain embodiments of the present disclosure. According to some embodiments, an image editing application receives an input indicating a brushstroke that is applied to a digital graphical image. The image editing application determines a direction of the input (e.g., with respect to a user interface), and generates brushstroke directional data indicating the direction of the applied brushstroke. The image editing application also receives an additional input indicating an editing tool, such as an eraser, that is applied to the digital graphical image, determines a direction of the additional input, and generates editing tool directional data indicating the direction of the applied editing tool. In some embodiments, the image editing application stores one or both of the brushstroke directional data or the editing tool directional data, and selectively edits the brushstroke based on a comparison of the brushstroke directional data with the editing tool directional data. In some cases, the image editing application compares the editing tool directional data to the brushstroke directional data, and determines a similarity based on the comparison. Based on the determined similarity, the image editing application edits the brushstroke based on the editing tool. For example, the image editing application erases portions of the brushstroke that have brushstroke directional data similar to the direction of an eraser editing tool. Alternatively, additional brushstrokes with additional brushstroke directional data are unaffected by the editing tool if the additional brushstroke directional data is different from the editing tool directional data.

In some embodiments, the directional data is determined and stored for each pixel included in a digital graphical image having a file format based on pixels (e.g., raster graphics, a bitmap image). For example, a pixel-based digital graphical image is edited in an image editing application by a user. The user provides an input to apply a brushstroke to the digital graphical image. Based on the input, the image editing application identifies a set of pixels included in the brushstroke. The image editing application also identifies graphical information describing the set of pixels, such as color, location, transparency, or other graphical information. Additionally or alternatively, the image editing application determines directional information describing the set of pixels, such as an array of vector data describing the motion of the input for each pixel in the set of pixels. The image editing application modifies a data structure to store the graphical information and directional information associated with each pixel. In some embodiments, the image editing application receives additional inputs indicating an editing tool applied to the digital graphical image. The image editing application determines, for example, directional information describing the motion of the editing tool and an additional set of pixels included in applied area of the editing tool. The image editing application compares the stored directional information describing the brushstroke to the directional information describing the editing tool. Based on the comparison, the image editing application determines a similarity between the editing tool directional data and the brushstroke directional data describing the set of pixels. For example, the image editing application determines that the editing tool is applied to one or more particular pixels, and further determines that the editing tool directional data is similar to the brushstroke directional data for the particular pixels. Based on the determined similarity, the image editing application modifies the data structure, such as by editing the particular pixels having directional data similar to the editing tool directional data.

As used herein, the terms "digital graphical image" and "image" refer to images including pixels, such as a raster image or a bitmap image. In some cases, a digital graphical image has a structure that is based on pixels, including a visual appearance (e.g., raster graphics) or a file format (e.g., .BMP, .JPG, .JPEG, .PNG). A digital graphical image, for example, includes a quantity of pixels arranged in one or more arrays, and each pixel is associated with data describing the appearance of the pixel, such as color, location, transparency, saturation, or any other suitable visual characteristic. Additionally or alternatively, the digital graphical image includes additional data associated with each pixel, such as directional data, image layers, printing information, or any other suitable type of data. A digital graphical image is created and modified via a computing system, such as a computing system executing an image editing application.

As used herein, the term "image editing application" refers to an application, executed on a computing system, that is capable of creating or modifying a digital graphical image. An image editing application is executed, for example, on a personal computer, a personal mobile device (e.g., smartphone, tablet computer), a server, a virtual computing system (e.g., a virtual machine, a cloud service), or any other suitable computing system or combination of computing systems. An image editing application includes image editing functions, such as brushstrokes, editing tools, graphical effects, or any other suitable image editing function. For example, an image editing application includes a graphical user interface having one or more functions that are accessed via inputs to the user interface. In some cases, an image editing application enables image layers, such as by enabling assignment of one or more pixels to a layer of a digital graphical image. For example, the image editing application enables one or more layers to be designated as an active layer or an inactive layer. An active layer includes one or more pixels that are available for editing via the functions of the image editing application. An inactive layer includes one or more pixels that are unavailable for editing (e.g., a "locked" layer). In some cases, an active (or inactive) layer is convertible to an inactive (or active) layer, such as in response to a user input to the graphical user interface.

As used herein, the term "brushstroke" refers to a group of graphical information that is included in a digital graphical image based on a brush tool applied to the digital graphical image. For example, a motion of a brush tool across an image generates (or modifies) graphical information that is included in the digital graphical image. The motion of the brush tool is associated, for example, with a particular input (e.g., a particular "click-and-drag" motion associated with a mouse, a particular "swipe" motion associated with a fingertip on a touchscreen.) In some cases, one or more pixels are included in a brushstroke, such as pixels across which the brush tool is moved. Additionally or alternatively, the pixels that are included in the brushstroke have at least some identical graphical information, such as an identical color or an identical visual effect (e.g., various colors that are determined based on an identical color gradient effect or pattern effect). In some cases, a pixel may be included in multiple brushstrokes, such a pixel that has one or more brush tools applied on multiple occurrences. The pixel included in the multiple brushstrokes is associated with, for example, graphical information of each brushstroke. Additionally or alternatively, the digital graphical image displays a particular one of the graphical information associated with the pixel, such as a "most recent" brushstroke.

As used herein, the term "editing tool" refers to a function of an image editing application that enables modification of graphical information included in a displayed image. Examples of an editing tool include, without limitation, an eraser, a brush tool, a color modification tool, a text tool, a fill tool (e.g., filling an area with a color or pattern), or any other suitable editing function of the image editing application. In some cases, a motion of an editing tool across an image generates (or modifies) graphical information that is included in the digital graphical image. The motion of the editing tool is associated, for example, with a particular input (e.g., a particular "click-and-drag" motion associated with a mouse, a particular "swipe" motion associated with a fingertip on a touchscreen.) In some cases, the editing tool is applied to one or more pixels in the image, such as pixels across which the editing tool is moved. Additionally or alternatively, graphical information associated with the one or more pixels is modified, or selectively modified, based on the applied editing tool.

Referring now to the drawings, FIG. 1 is an example of a system 100 in which an image editing application 110 selectively edits brushstrokes in an image. In some cases, the image editing application selectively edits a brushstroke that is included in an image layer, out of multiple brushstrokes included in the image layer. The image editing application 110 is executed, for example, on a suitable computing system, such as a personal mobile device. The image editing application 110 communicates with a display device 105, and with one or more input devices 103. For example, the image editing application 110 provides information to the display device 105 for displaying a visual representation of one or more of image 121 or user interface 107. Additionally or alternatively, the image editing application 110 receives information from the input devices 103, such as a selection of an editing tool represented by the user interface 107, or motion of the selected editing tool upon the displayed image 121. In some cases, the display device 105 is also an input device 103, such as a touchscreen capable of receiving inputs.

In some embodiments, the image editing application 110 accesses an image file 120. For example, the image file 120 is stored in a memory structure (e.g., a local memory component, a network-accessible storage device) that is accessible by the computing system on which the image editing application 110 is executed. In some embodiments, the image file 120 includes image graphical data 122. The image graphical data 122 includes, for example, information describing the visual appearance of image 121 as displayed on display device 105, such as pixel locations, colors, brushstrokes, lines, image size (e.g., dimensions in pixels), visual effects, or any other suitable graphical information. Additionally or alternatively, the image file 120 includes image directional data 124. For example, the image editing application 110 receives an input indicating an application of a brushstroke to the displayed image 121. The image editing application 110 determines a direction of the brushstroke, for example, by generating and storing image directional data 124. The image directional data 124 includes, for example, one or more of vector information associated with pixels, historical information indicating a sequence in which pixels or brushstrokes are modified, starting points and ending points of brushstrokes, or other information suitable for determining direction of brushstrokes. Additionally or alternatively, the image editing application 110 accesses stored image directional data 124 via the image file 120, such as by accessing directional data previously saved with the image file 120. In some cases, the image file 120 includes additional data, such as image layer data, directional data, time information (e.g., indicating how recently a pixel or brushstroke was modified), metadata, printing data, or other suitable data.

Based on information included in the image file 120, the image editing application 110 in system 100 provides data for displaying an image 121 on the display device 105. For example, the image editing application 110 provides data for displaying brushstroke 140, brushstroke 142, and brushstroke 144 in the image 121. Additionally or alternatively, the image editing application 110 modifies the information included in the image file 120 based on input data received from the input devices 103. In some cases, an input received by the image editing application 110 indicates a modification to the image graphical data 122 of the image file 120. Additionally or alternatively, the received input indicates a modification to non-graphical data of the image file 120, such as a modification to layer data, directional data, or any other suitable non-graphical data.

In some embodiments, the image editing application 110 receives an input indicating an application of an editing tool, such as from the user interface 107, to the displayed image 121. The image editing application 110 determines a direction of the applied editing tool, for example, by generating and storing editing tool directional data 130. In system 100, the image editing application 110 includes a comparison module 150. Additionally or alternatively, the comparison module 150 is accessed by the image editing application 110, such as by accessing the comparison module 150 via another computing system (e.g., a remote server, a cloud-based service). The comparison module 150 compares the editing tool directional data 130 and the image directional data 124. Based on the comparison, a similarity is determined between the editing tool directional data 130 and the image directional data 124. For example, the comparison module 150 determines that the editing tool directional data 130 includes a starting point near the upper left of image 121, an ending point near the bottom middle of the image 121, and indicates that the editing tool is moved in a direction generally downwards and to the right, over pixels that are also included in brushstrokes 140 and 142. In addition, the comparison module determines that the image directional data 124 includes a direction associated with brushstroke 140 that has a starting point, an ending point, and a direction generally downwards and to the right. In some cases, the comparison module 150 provides an indication that the editing tool and brushstroke 140 have similar directions. Additionally or alternatively, the comparison module 150 provides one or more additional indications that the editing tool and brushstrokes 142 and 144 have dissimilar directions. Responsive to receiving the one or more indications, for example, image editing application 110 selectively edits brushstroke 140 based on the applied editing tool. Additionally or alternatively, image editing application 110 selectively does not apply the editing tool to brushstrokes 142 or 144. For example, although FIG. 1 depicts brushstroke 140 and 142 as overlapping (e.g., a region of pixels is included in both brushstrokes), the image editing application 110 selectively edits brushstroke 140 and does not edit brushstroke 142, based on a similarity between the directions of the editing tool and brushstroke 140, and a dissimilarity between the directions of the editing tool and brushstroke 142.

In system 100, the image editing application 110 selectively edits a portion of a brushstroke, based on a similarity of the directions of the portion of the brushstroke and an applied editing tool. For example, an additional editing tool is moved over pixels that are included in brushstroke 144 The comparison module 150 determines that the editing tool directional data 130 for the additional editing tool includes a starting point that is near a curved portion of brushstroke 144, an ending point near a bottom edge of brushstroke 144, and that the additional editing tool was moved in a direction generally downwards and to the left. The comparison module 150 determines, for example, a similarity between the directions of the additional editing tool and the bottom portion of brushstroke 144, and a dissimilarity between the directions of the additional editing tool and the upper portion of brushstroke 144. Based on the determined similarity (or dissimilarity), the image editing application 110 selectively edits the bottom portion of brushstroke 144 and does not edit the upper portion, even if the additional editing tool was moved over pixels included in the upper portion (e.g., the additional editing tool is larger than the width of brushstroke 144). In some cases, if an editing tool is moved in a curving or alternating (e.g., zigzag) direction, image editing application 110 generates (or modifies) editing tool directional data 130 to indicate the curving or alternating direction. Additionally or alternatively, the image editing application 110 selectively edits a curving or alternating portion of a brushstroke, based on a similarity determined by the comparison module 150. In some cases, a brushstroke is selectively edited based on directional data of the brushstroke and an editing tool indicating one or more of an absolute value of a slope or an opposite direction (e.g., the brushstroke has a direction from left to right and the editing tool has a direction from right to left).

Figure 2:
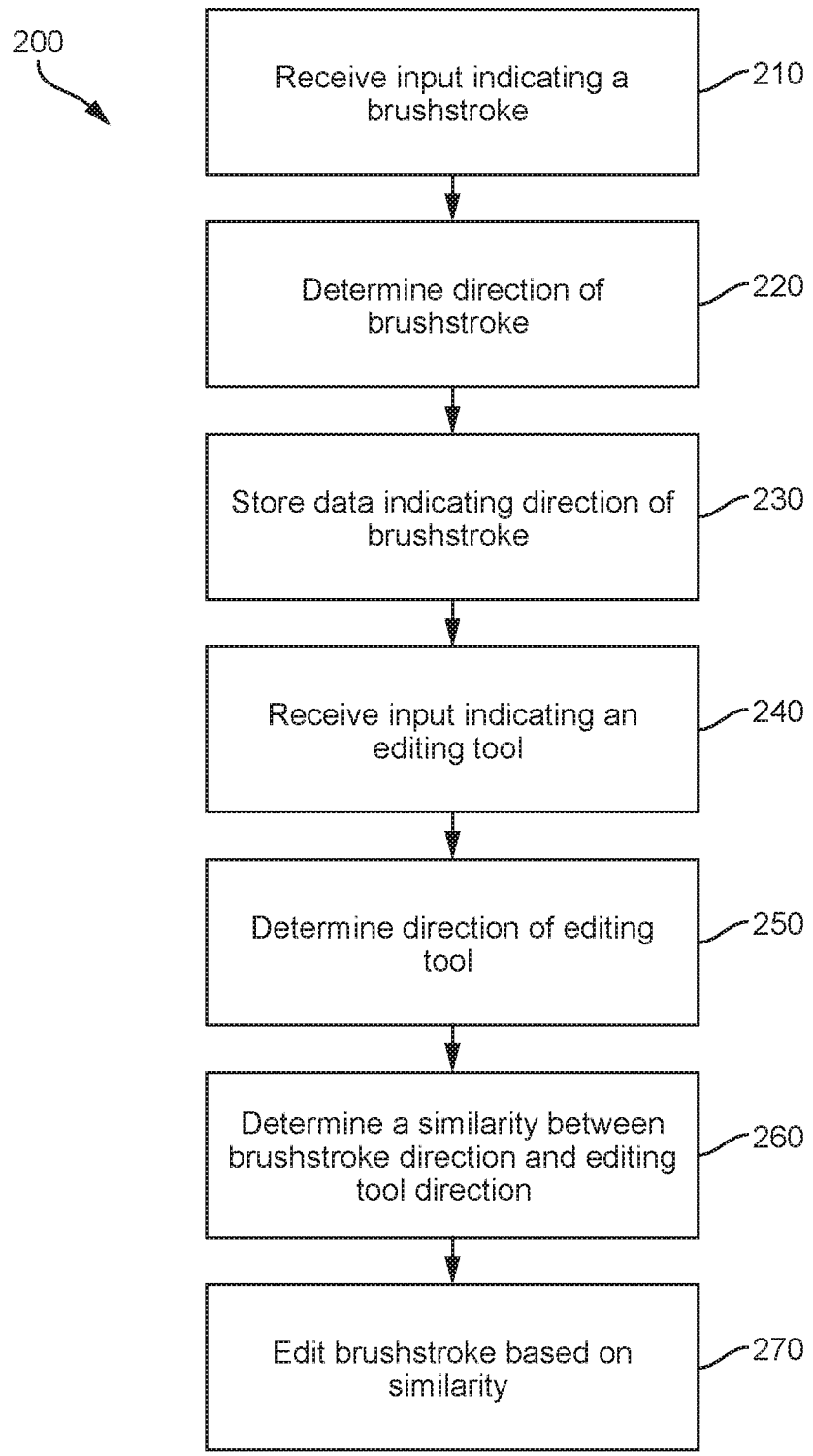
FIG. 2 is a flowchart depicting an example of process for selectively editing brushstrokes based on direction, according to certain embodiments.

FIG. 2 is a flowchart depicting an example of a process 200 for selectively editing brushstrokes based on direction. In some cases, the process 200 involves selectively editing a brushstroke that is included in an image layer, based on directions of one or more brushstrokes included in the layer. In some embodiments, such as described in regards to FIG. 1, a computing device executing an image editing application implements operations described in FIG. 2, by executing suitable program code. For illustrative purposes, the process 200 is described with reference to the examples depicted in FIG. 1. Other implementations, however, are possible.

At block 210, the process 200 involves receiving an input indicating a brushstroke applied to a digital graphical image. For example, the image editing application 110 receives an input from the input device 103, indicating a brushstroke applied to the digital graphical image 121. In some cases, the input indicates information related to applying brushstrokes, such as a "brush" or "pen" selection from a user interface. For example, the input received from the input device 103 may indicate a brush selected from the user interface 107.

At block 220, the process 200 involves determining a direction of the brushstroke. The direction is determined based on one or more of a sequence in which pixels are affected by the brushstroke, a starting point and an ending point of the brushstroke, one or more slopes associated with the brushstroke, or any other suitable information. In some cases, the image editing application 110 determines the direction of the brushstroke. Additionally or alternatively, the direction of the brushstroke is determined by an additional service, such as a directional service accessed by the image editing application 110 via one or more networks.

At block 230, the process 200 involves storing data indicating the determined direction of the brushstroke. For example, directional data related to one or more of brushstrokes 140, 142, or 144 is stored in the image directional data 124. The image directional data 124 is stored, for example, in the image file 120. Additionally or alternatively, the image directional data 124 is stored in an additional data structure, such as a data structure that is accessed by the image editing application 110 via one or more networks. In some cases, the directional data is stored in one or more of an array, a database, or any other suitable data structure.

At block 240, the process 200 involves receiving an additional input indicating an editing tool applied to the digital graphical image. For example, the image editing application 110 receives an additional input from the input device 103, indicating an editing tool applied to the image 121. In some cases, the additional input indicates information related to modifying brushstrokes, such as an "eraser" or "color-changing" selection from a user interface. For example, the additional input received from the input device 103 may indicate an eraser selected from the user interface 107.

At block 250, the process 200 involves determining a direction of the editing tool. The direction is based on one or more of a sequence in which pixels are affected by the editing tool, the starting point and an ending point of the editing tool, one or more slopes associated with the editing tool, or any other suitable information. In some embodiments, additional data indicating the direction of the editing tool is stored, such as in a temporary memory location, a data structure indicating a "change history," or via another suitable storage technique. In some cases, the image editing application 110 determines the direction of the editing tool. Additionally or alternatively, the direction of the editing tools determined by an additional service, such as a directional service accessed by the image editing application 110 via one or more networks.

At block 260, the process 200 involves determining a similarity between the brushstroke direction and the editing tool direction. In some cases, the similarity is based on a comparison of the stored data indicating the brushstroke direction, and additional data indicating the editing tool direction. Additionally or alternatively, the similarity is based on a comparison of respective slopes, sequences of affected pixels, starting points and ending points, or any other suitable information respectively describing the brushstroke direction and editing tool direction. For example, the comparison module 150 determines a similarity based on a comparison of the direction of the brushstroke and the direction of the editing tool. Additionally or alternatively, the comparison module 150 provides to the image editing application 110 an indication of the comparison or a result of the comparison.

At block 270, the process 200 involves selectively editing the brushstroke based on the determined similarity. Additionally or alternatively, the brushstroke may be unaffected by the editing tool based on a determined dissimilarity. For example, the image editing application 110 selectively edits a brushstroke, such as brushstroke 140, based on a determined similarity between the brushstroke direction and the editing tool direction. Additionally or alternatively, the image editing application 110 selectively does not edit an additional brushstroke, such as brushstroke 142, based on a determined dissimilarity between the additional brushstroke direction and the editing tool direction.

Figure 3:
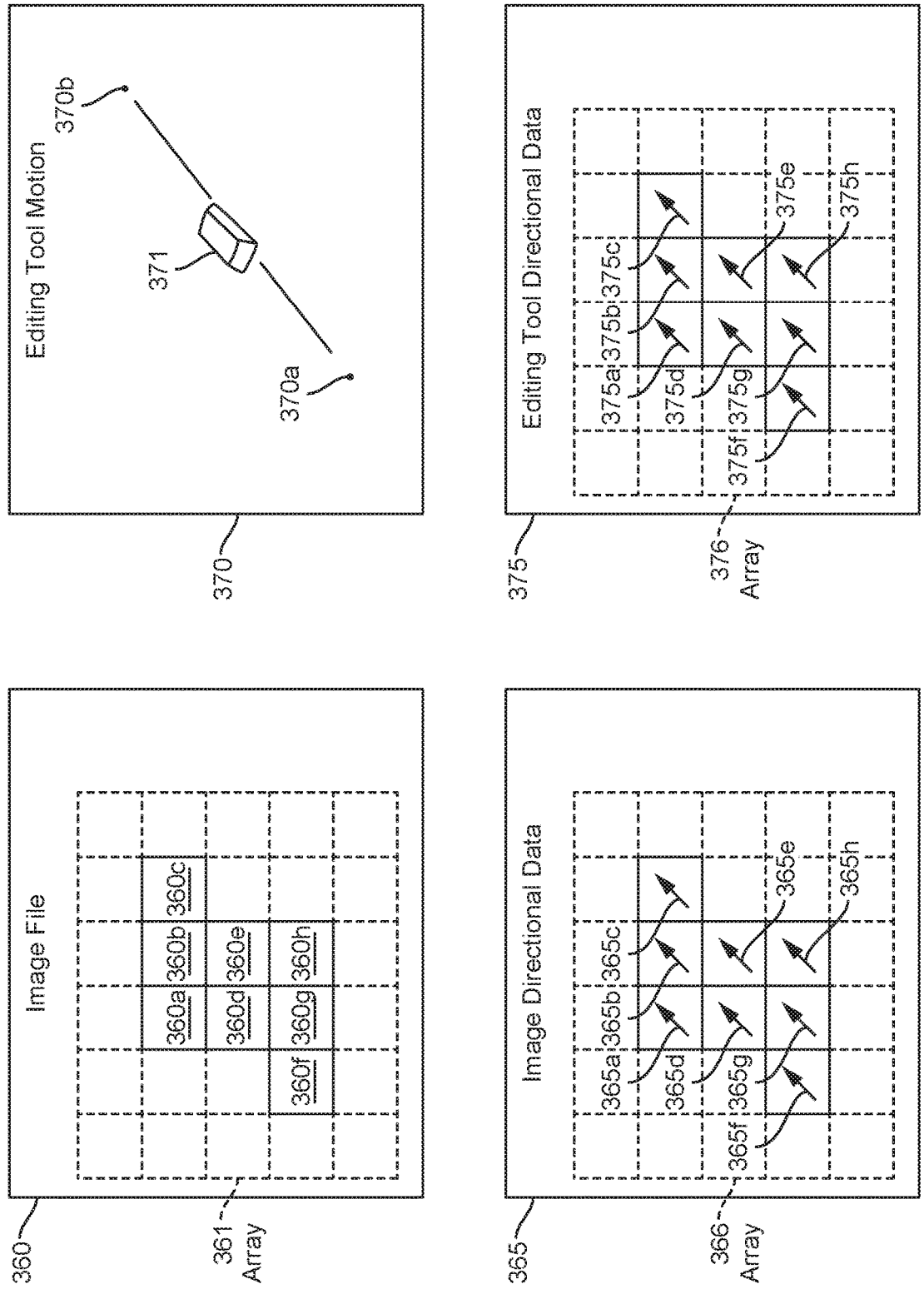
FIG. 3 is a is a diagram depicting an example of a data structure in which directional information for one or more pixels is stored, according to certain embodiments.

In some embodiments, directional data for one or more of a brushstroke or an editing tool is determined based on information describing each pixel included in the brushstroke or each pixel to which the editing tool is applied. The information describing each pixel is stored, for example, in an array or another suitable data structure. FIG. 3 is a diagram depicting an example of a data structure in which directional information for one or more pixels is stored. In FIG. 3, an image file 360 includes one or more pixels, such as pixels 360a through 360h. The pixels 360a through 360h are included, for example, in image graphical data, such as the image graphical data 122 described in regards to FIG. 1. In some cases, the image file 360 includes information describing visual characteristics of the pixels 360a through 360h, such as location or color. Additionally or alternatively, the image file 360 includes information describing non-visual characteristics of the pixels 360a through 360h, such as an indication of pixels associated with a particular brushstroke (e.g., pixels modified by a same input), or time information indicating how recently a pixel (or brushstroke) had been modified (or generated). In some cases, an image is displayed based on information included in the image file 360. For example, the display device 105 displays an image based on the image file 360.

Additionally or alternatively, the image file 360 includes one or more data structures in which information describing the pixels 360a through 360h is stored. For example, the data structure includes an array of pixels, such as an array 361 including the pixels 360a through 360h. Additional pixels may be included in the array 361, but are omitted from FIG. 3 for clarity. In some cases, one or more pixels in the array are associated together. For example, multiple pixels that are modified based on a particular input (e.g., a particular mouse action or fingertip action) are associated with a particular brushstroke. A particular pixel in array 361 may be associated with more than one brushstroke, such as if multiple brushstrokes are applied to the particular pixel. In some cases, the array 361 includes information describing characteristics of multiple brushstrokes for the particular pixel, such as a color for each respective brushstroke applied to the particular pixel, or time information (e.g., a timestamp, a sequence) describing a history of brushstrokes applied to the particular pixel.

In some embodiments, one or more pixels are associated with a data structure for storing directional information. For example, image directional data 365 is generated (or modified) based on brushstrokes applied an image displayed based on the image file 360. Additionally or alternatively, the image directional data 365 includes information describing each pixel included the in image file 360, such as vectors by which the directional information for each pixel is determined. In some cases, the image directional data 365 includes an array 366. The array 366 corresponds, for example, to the pixel array 361 in the image file 360. The array 366 includes vectors describing the pixels included in the pixel array 361. For example, the array 366 includes a vector 365a, corresponding to the pixel 360a. In addition, the array 366 includes additional vectors 365b through 365h, corresponding respectively to the pixels 360b through 360h.

In addition, FIG. 3 includes a diagram depicting the motion of an editing tool 371 across a digital graphical image, such as an image displayed based on the image file 360. The editing tool motion 370 includes a starting point 370a and an ending point 370b. In some cases, the editing tool motion 370 includes movement of the editing tool 371 across one or more pixels of the image, such as one or more of pixels 360a through 360h. Additionally or alternatively, editing tool directional data 375 is generated (or modified) based on the motion of the editing tool 371. For example, the editing tool directional data 375 includes information describing the direction of the motion over the pixels 360a through 360h. In some cases, the editing tool directional data 375 includes an array 376. The array 376 corresponds, for example, to the pixel array 361 in the image file 360. The array 376 includes vectors describing the editing tool motion 370. For example, the array 376 includes vectors 375a through 375h, corresponding respectively to the pixels 360a through 360h.

Although FIG. 3 depicts visual representations of the array 361, array 366, and array 376, other representations are possible, including data structures not intended for human interpretation. Additionally or alternatively, one or more of the image directional data 365 or the editing tool directional data 375 includes additional information by which the vectors 365a through 365h or 375a through 375h are determined, such as a sequence of pixels or a starting and ending point of the brushstroke or editing tool motion. In some cases, one or more of the image directional data 365 or the editing tool directional data 375 includes information indicating a lack of directional data, such as a "null" vector corresponding to a pixel that is not associated with a brushstroke or motion of an editing tool.

Figure 4:
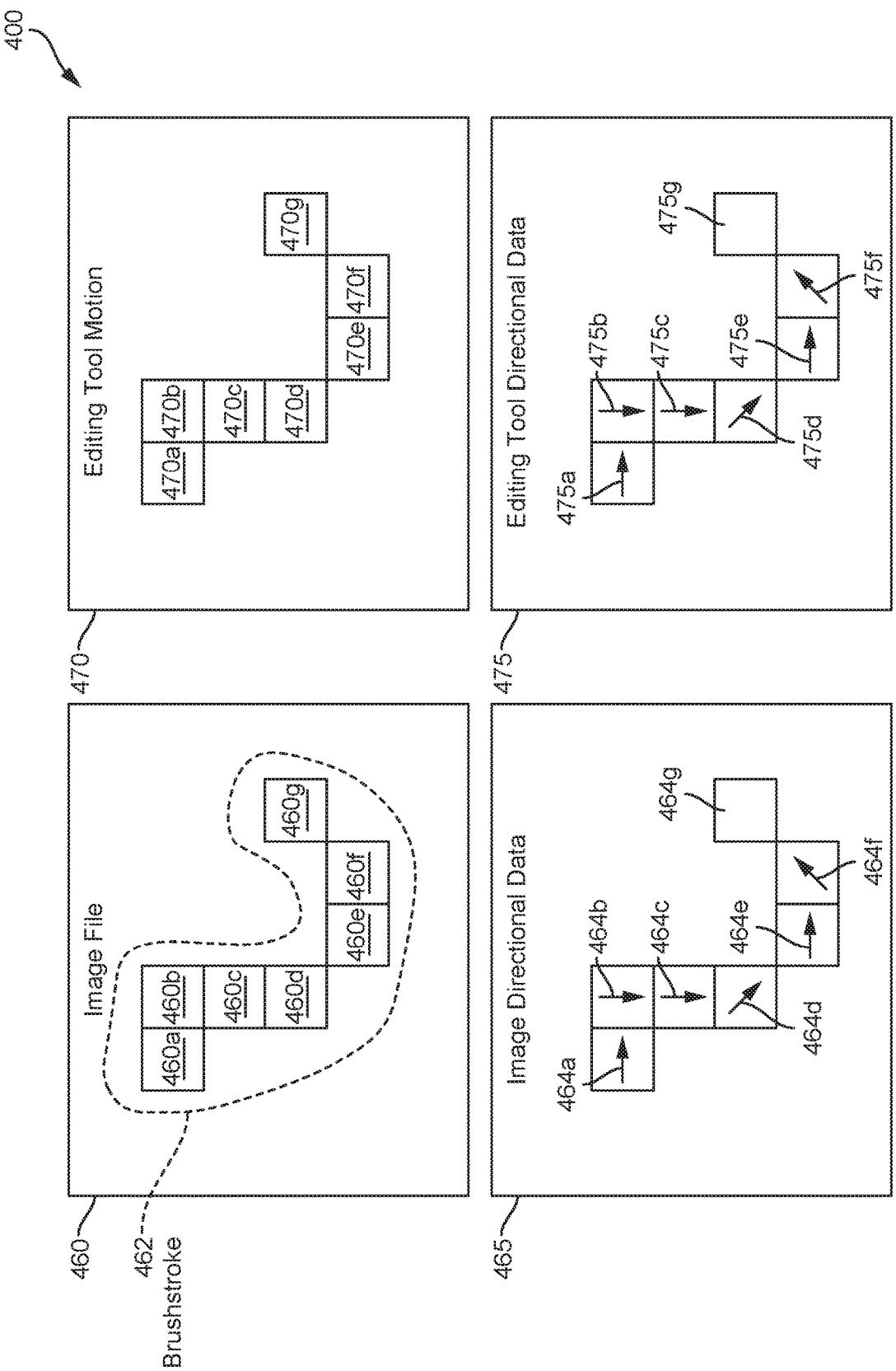
FIG. 4 is a diagram depicting examples of data structures from which flow is determined, according to certain embodiments.

In some embodiments, a flow is determined for one or more pixels. The flow is based on, for example, directional data associated with a brushstroke or an editing tool. In some cases, the flow for a particular pixel is determined based on directional data describing the particular pixel and additional pixels that are associated with a same brushstroke (or editing tool motion). For example, the flow for the particular pixel is determined based on a slope between a location of the particular pixel and an additional location of an additional pixel that is included in the same brushstroke. FIG. 4 is a diagram depicting examples of data structures from which flow is determined for one or more of a brushstroke or an editing tool. An image file 460 includes one or more pixels, such as pixels 460a through 460g. Additionally or alternatively, each of the pixels 460a through 460g is associated with directional data including a respective location and respective sequence for each pixel. In some cases, the pixels 460a through 460g are associated with a particular brushstroke 462. For example, the brushstroke 462 is generated (or modified) based a particular input, such as a particular input based on a single "click-and-drag" motion associated with a mouse, or a single "swipe" motion associated with a fingertip on a touchscreen.

Additionally or alternatively, each of the pixels 460a through 460g is associated with directional data, such as image directional data 465, including a respective location and respective sequence for each pixel included in the brushstroke 462. The image directional data 465 includes one or more data structures suitable to store directional data associated with each pixel included in the image file 460. For example, the image directional data 465 includes a structure 464a that stores directional data associated with pixel 460a. Additionally or alternatively, the image directional data 465 includes structures 464b through 464g that store, respectively, directional data associated with pixels 460b through 460g. In some cases, the image directional data 465 represents all pixels included in the image file 460, and the image directional data 465 is modified based on additional brushstrokes that are applied to an image displayed based on the image file 460. Although FIG. 4 depicts the structures 464a through 464g as elements, such as elements in an array, other structures are possible, including structures not intended for human interpretation.

In FIG. 4, directional data for each of the pixels 460a through 460g is generated (or modified) based on a location of each pixel to which a particular input is applied, and a sequence in which the input is applied to each pixel included in the brushstroke 462 (e.g., initial pixel, subsequent pixel, last pixel). In some cases, the location of the pixels 460a through 460g is based on an x-y coordinate system. Additionally or alternatively, each of the structures 464a through 464g are generated (or modified) based on the pixels 460a through 460g. For example, each of the structures 464a through 464g includes a location and a sequence associated with, respectively, the pixels 460a through 460g.

In some cases, a flow is determined for each of the pixels 460a through 460g based on the respective location and sequence of the pixels. For example, the image directional data 465 indicates that, of the pixels included in the brushstroke 462, pixel 460a is first in sequence of modification (e.g., by an input), and that the modification of pixel 460a is followed by the sequential modifications of pixel 460b, pixel 460c, pixel 460d, pixel 460e, pixel 460f, and pixel 460g. Additionally or alternatively, a flow for pixel 460a is determined based on the location of pixel 460a and an additional location of an additional pixel that is subsequent to pixel 460a in the sequence of modification, such as pixel 460b. For example, a slope between pixels 460a and 460b is determined based on a subtraction of the location of pixel 460a from the location of the subsequent pixel 460b, such as a subtraction of x and y coordinates of pixel 460a from x and y coordinates of pixel 460b. Equation 1 describes an example technique for determining a slope between two locations having coordinates in an x-y plane.

$$\frac{y_2 - y_1}{x_2 - x_1} = m \qquad \text{Eq. 1}$$

In Equation 1, the slope m between a first location and a second location is determined based on a difference between $y_2$ (e.g., a y coordinate of the second location) and $y_1$ (e.g., a y coordinate of the first location), divided by a difference between $x_2$ (e.g., an x coordinate of the second location) and $x_1$ (e.g., an x coordinate of the first location). Although Equation 1 describes a technique to determine slope in an x-y coordinate plane, other techniques are available, including techniques suitable for radial coordinates, cylindrical coordinates, spherical coordinates, or other techniques suitable for any two-dimensional or three-dimensional system for representing locations or pixels. Additionally or alternatively, a distance between the first and second location is determined based on the coordinates of the locations.

In some cases, a flow vector between pixels 460a and 460b is determined based on one or more of a slope or a distance between the pixels 460a and 460b. The slope and distance between pixels 460a and 460b is determined, for example, based on a location and sequence described by structure 464a and a location and sequence described by structure 464b. The structures 464a and 464b are modified, for example, to include the respective determined slopes (or vectors) for pixels 460a and 460b. Additionally or alternatively, the respective determined slopes (or vectors) for pixels 460a and 460b are stored using other techniques, such as temporary storage in a memory component. In some cases, the image directional data 465 indicates a lack of directional data for a particular pixel. For example, the structure 464g describes that pixel 460g is a final pixel in the sequence for brushstroke 462. As pixel 460g does not have a subsequent pixel on which slope or distance may be determined, the structure 464g indicates, for example, a "null" flow vector.

In some embodiments, a combined flow for a pixel is based on multiple slopes (or distances) associated with the pixel. For example, if directional data is generated based on a brush tool applied to multiple pixels at a given time (e.g., a brush tool with a relatively large area as compared to an area of a pixel), the combined flow for a particular pixel is generated based on the slopes between the particular pixel and multiple pixels to which the brush is subsequently applied. As a non-limiting example, a combined flow vector for pixel 460a is determined based on multiple slopes, such as slopes between pixels 460a and 460b, pixels 460a and 460c, and pixels 460a and 460d. Additionally or alternatively, the combined flow vector for pixel 460a is based on multiple distances, such as distances between pixels 460a and 460b, pixels 460a and 460c, and pixels 460a and 460d. The multiple slopes (or distances) are combined, such as by averaging, weighted averaging, determining a maximum, determining a minimum, or by any other suitable technique.

In addition, FIG. 4 includes a diagram depicting the motion of an editing tool, such as an eraser, across a digital graphical image, such as an image displayed based on the image file 460. The editing tool motion 470 includes positions 470a through 470g. In some cases, the editing tool motion 470 includes movement of the editing tool through positions that correspond to one or more pixels of the image, such as the positions 470a through 470g corresponding to, respectively, the pixels 460a through 460g. Additionally or alternatively, editing tool directional data 475 is generated (or modified) based on the editing tool motion 470. For example, the editing tool directional data 475 includes one or more structures, such as structures 475a through 475g, that are capable of storing directional data related to the editing tool positions, such as positions 470a through 470g. In some cases, the structures 475a through 475g correspond to the pixels 460a through 460g. Additionally or alternatively, the structures 475a through 475g correspond to the structures 464a through 464g in the image directional data 465. In some cases, the editing tool directional data 475 includes structures associated with all pixels included in the image file 460. Although FIG. 4 depicts the structures 475a through 475g as elements, such as elements in an array, other structures are possible, including structures not intended for human interpretation.

In some cases, a flow is determined for each of the positions 470a through 470g, based on the respective location and sequence of the positions. For example, the editing tool directional data 475 indicates that position 470a is first in sequence, and that the position 470a is followed by the sequential positions 470b, pixel 470c, pixel 470d, pixel 470e, pixel 470f, and pixel 470g. Additionally or alternatively, a flow for each of the positions 470a through 470g is determined based on the location of a particular position and an additional location of a subsequent position. For example, a slope between positions 470a and 470b is determined based on a subtraction of the location of position 470a from the location of the subsequent position 470b. Techniques related to determining slope or distance are provided above, such as described in regards to Equation 1.

In some cases, a flow vector between each of the positions 470a through 470g is determined based on one or more of a slope or a distance between the positions. For example, the slope and distance between positions 470a and 470b are determined based on a location and sequence described by structure 475a and a location and sequence described by structure 475b. The structures 475a through 475g are modified, for example, to include the respective determined slopes (or vectors) for the positions 470a through 470g. Additionally or alternatively, the respective determined slopes (or vectors) for the positions 470a through 470g are stored using other techniques, such as temporary storage in a memory component. In some cases, the editing tool directional data 475 indicates a lack of directional data for a particular position. For example, the structure 475g describes that the position 470g is a final position in the sequence for the editing tool motion 470. As the final position does not have a subsequent position on which slope or distance may be determined, the structure 475g indicates, for example, a "null" flow vector.

Additionally or alternatively, a combined flow for a position of the editing tool motion 470 is based on multiple slopes (or distances) associated with the position. For example, if directional data is generated based on an editing tool applied to multiple pixels at a given time (e.g., an editing tool with a relatively large area as compared to an area of a pixel), the combined flow for a particular position is generated based on the slopes between the particular position and multiple positions to which the editing tool is subsequently applied. As a non-limiting example, a combined flow vector for the position 470a is determined based on multiple slopes or multiple distances. For example, a flow vector stored for position 470a is determined based on multiple slopes (or distances), such as slopes (or distances) between positions 470a and 470b, positions 470a and 470c, and positions 470a and 470d. The multiple slopes (or distances) are combined, such as by averaging, weighted averaging, determining a maximum, determining a minimum, or by any other suitable technique.

In some embodiments, a brushstroke is selectively edited based on a comparison of a flow vector associated with the brushstroke and a flow vector associated with an editing tool motion. In FIG. 4, the brushstroke 462 is selectively edited based on a comparison between the flow vectors based on the image directional data 465 and the flow vectors based on the editing tool directional data 475. For example, the structure 464a and the structure 475a are each associated with the pixel 460a. The structure 464a includes a flow vector associated with the pixel 460a, and the structure 475a includes a flow vector associated with the position 470a. In some cases, based on an association with a particular pixel (e.g., pixel 460a), the flow vector for the pixel 460a is compared to the flow vector for the position 470a, such as a comparison based on respective slopes and distances stored in the structures 464a and 475a. Based on a determined similarity between the compared flow vectors (e.g., slopes with values within 5% of each other), the brushstroke 462 is selectively edited based on the editing tool motion 470.

In some cases, the flow vector of the editing tool is compared to multiple flow vectors associated with a particular pixel. For example, the pixel 460a is included in multiple brushstrokes in addition to brushstroke 462. Based on the multiple additional brushstrokes, the structure 464a includes multiple flow vectors associated the pixel 460a (e.g., a flow vector for each brushstroke). The flow vector associated the position 470a is compared, for example, to each of the multiple flow vectors associated the pixel 460a (e.g., the editing tool directional data 475 is compared to each brushstroke represented by image directional data 465). Based on the comparison, a similarity is determined between the flow vector associated the position 470a and each of the multiple flow vectors associated the pixel 460a. Of the multiple brushstrokes, a particular brushstroke having above a threshold similarity to the editing tool motion (e.g., flow vectors with slope values within 5% of each other) is selectively edited based on the editing tool motion. Additionally or alternatively, a particular brushstroke with the highest similarity to the editing tool motion is selectively edited. In some cases, if multiple brushstrokes have above the threshold similarity to the editing tool motion, a particular brushstroke meeting an additional criteria (e.g., most recently added, least recently added) is selectively edited.

Figure 5:
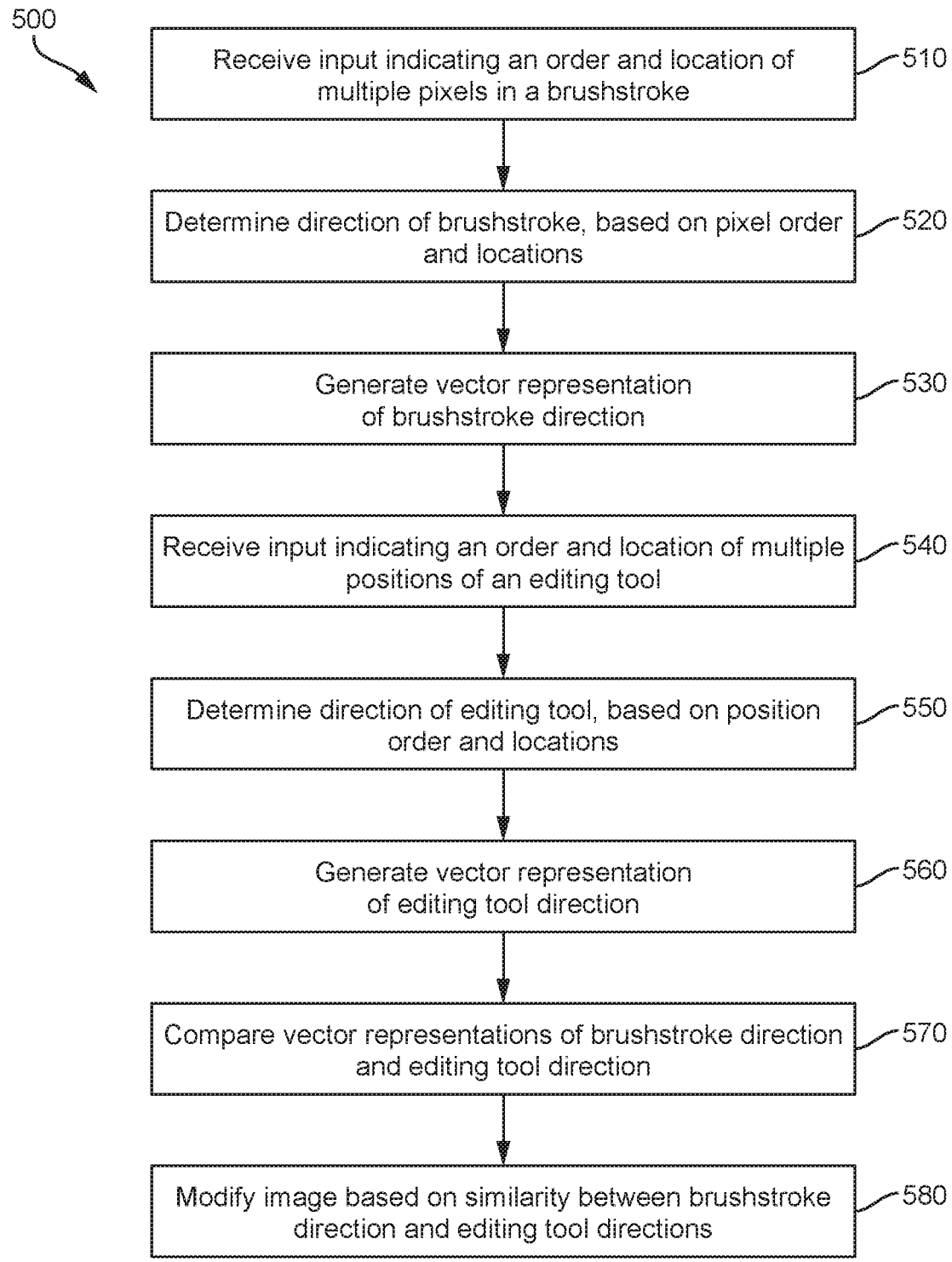
FIG. 5 is a flowchart depicting an example of process for selectively editing a brushstroke based on a similarity between flow vectors, according to certain embodiments.

FIG. 5 is a flow chart depicting an example of a process 500 for selectively editing a brushstroke based on a similarity between flow vectors. In some cases, the process 500 involves selectively editing a brushstroke that is included in an image layer, based on flow vectors of one or more brushstrokes included in the layer. In some embodiments, such as described in regards to FIGS. 1-4, a computing device executing an image editing application implements operations described in FIG. 5, by executing suitable program code. For illustrative purposes, the process 500 is described with reference to the examples depicted in FIGS. 1-4. Other implementations, however, are possible.

At block 510, the process 500 involves receiving an input indicating a sequence and location for each of multiple pixels included in a brushstroke that is applied to a digital graphical image. For example, a brushstroke 462 includes multiple pixels 460a through 460g, and each of the pixels 460a through 460g is associated with a location (e.g., an x-y coordinate) and a sequence (e.g., initial pixel, subsequent pixel, last pixel).

At block 520, the process 500 involves determining directional data associated with the brushstroke, based on the sequence and locations of the multiple pixels in the brushstroke. For example, image directional data 465 includes directional data that is generated (or modified) based on the sequence and locations of each of the pixels 460a through 460g included in the brushstroke 462. In some cases, the directional data for the brushstroke includes one or more of a slope or distance between pixels in the brushstroke.

At block 530, the process 500 involves generating one or more vector representations, such as flow vectors, of the directional data associated with the brushstroke. In some cases, the generated vector representations are included in the directional data associated with the brushstroke. For example, image directional data 465 is modified to include each flow vector that is determined based on the sequence and locations of the pixels 460a through 460g. Additionally or alternatively, the generated vector representations are stored in an additional data structure, such as a memory component for temporary storage.

At block 540, the process 500 involves receiving an input indicating a sequence and location for each of multiple positions included in motion of an editing tool that is applied to the digital graphical image. For example, editing tool motion 470 includes multiple positions 470a through 470g, and each of the positions 470a through 470g is associated with a location (e.g., an x-y coordinate) and a sequence (e.g., initial position, subsequent position, last position).

At block 550, the process 500 involves determining directional data associated with the editing tool motion, based on the sequence and locations of the multiple positions in the motion. For example, editing tool directional data 475 includes directional data that is generated (or modified) based on the sequence and locations of each of the positions 470a through 470g. In some cases, the directional data for the editing tool includes one or more of a slope or distance between the positions.

At block 560, the process 500 involves generating one or more vector representations, such as flow vectors, of the directional data associated with the editing tool motion. In some cases, the generated vector representations are included in the directional data associated with the motion. For example, editing tool directional data 475 is modified to include each flow vector that is determined based on the sequence and locations of the positions 470a through 470g. Additionally or alternatively, the generated vector representations are stored in an additional data structure, such as a memory component for temporary storage.

At block 570, the process 500 involves comparing one or more vector representations associated with the brushstroke to one or more vector representations associated with the editing tool motion, such as by comparing brushstroke flow vectors to editing tool flow vectors. In some cases, a flow vector determined for a position of the editing tool is compared to a flow vector for a pixel included in the brushstroke, the pixel having a location corresponding to the location of the editing tool position. Additionally or alternatively, a similarity is determined between the brushstroke flow vectors and the editing tool flow vectors, such as a similarity based on a comparison of a slope (or distance) of a brushstroke flow vector and a slope (or distance) of a corresponding editing tool flow vector. For example, brushstroke flow vectors that are determined based on image directional data 465 are compared to editing tool flow vectors that are determined based on editing tool directional data 475. Regarding image directional data 465 and editing tool directional data 475, for example, a similarity is determined between a brushstroke flow vector and an editing tool flow vector associated respectively with the corresponding structures 464a and 475a. The similarity is based, for example, on a comparison of the respective slopes and distances associated with the structures 464a and 475a. In some cases, the similarity is determined based on an absence of a slope or distance. For example, an editing tool (or brushstroke) that is applied to multiple pixels simultaneously (e.g., a "color fill" editing tool) is associated with a "null" flow vector. Additionally or alternatively, the editing tool (or brushstroke) is determined to have a similarity to a brushstroke (or editing tool) that also is associated with a "null" flow vector.

In some embodiments, block 570 involves a comparison of an editing tool vector representation to multiple brushstroke vector representations associated with multiple brushstrokes. For example, a flow vector for an editing tool position is compared to multiple flow vectors for a corresponding pixel that is included in multiple brushstrokes. Additionally or alternatively, a similarity is determined between the editing tool flow vector and each of the brushstroke flow vectors that are associated with the corresponding pixel. Each similarity is determined, for example, based on a comparison of the slope (or distance) of the editing tool flow vector to the respective slope (or distance) of each of the brushstroke flow vectors.

At block 580, the process 500 involves selectively modifying the digital graphical image based on the determined similarity between the directional data of the brushstroke and the directional data of the editing tool. For example, based on the editing tool flow vector and the brushstroke flow vector having a similarity within a threshold similarity (e.g., slope values within 5% of each other), the digital graphical image is modified by selectively editing the brushstroke (or portions of the brushstroke) based on the editing tool. In some cases, one or more pixels of the digital graphical image are selectively modified to remove (or edit) graphical information related to the selectively edited brushstroke. Additionally or alternatively, graphical information related to additional brushstrokes (e.g., not having the threshold similarity) is unmodified. For example, based on a determined similarity between brushstroke flow vectors associated with brushstroke 462 and editing tool flow vectors associated with editing tool motion 470, one or more of the pixels 460a through 460g are selectively modified to remove (or edit) graphical information (e.g., color, visual effects) associated with brushstroke 462. In some cases, additional graphical information (e.g., unassociated with brushstroke 462) of the pixels 460a through 460g is unmodified.

Figure 6:
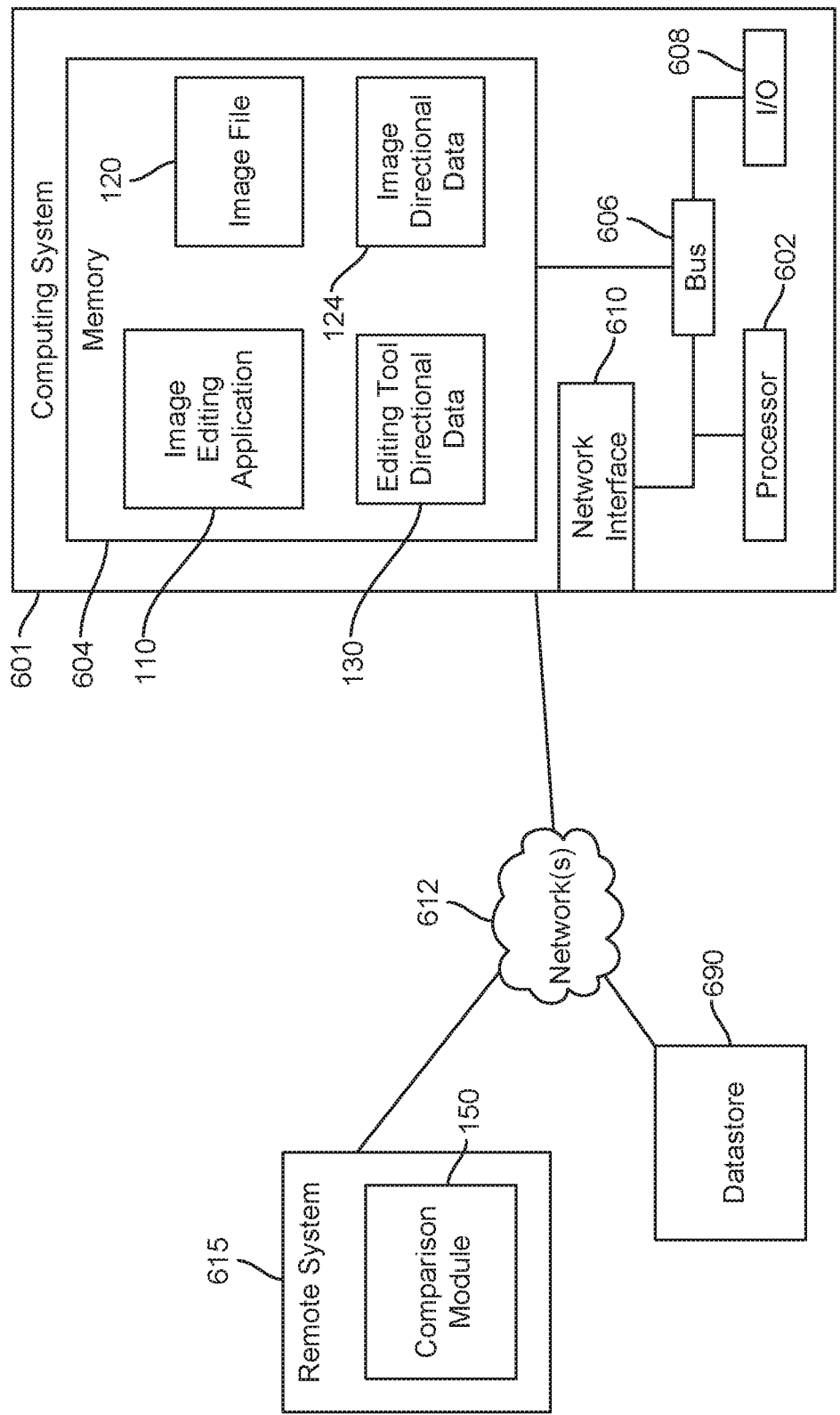
FIG. 6 is a block diagram depicting an example of a computing system for selectively editing brushstrokes in a digital graphical image, according to certain embodiments.

Any suitable computing system or group of computing systems can be used for performing the operations described herein. For example, FIG. 6 is a block diagram depicting a computing system for selectively editing brushstrokes, according to certain embodiments.

The depicted example of a computing system 601 includes one or more processors 602 communicatively coupled to one or more memory devices 604. The processor 602 executes computer-executable program code or accesses information stored in the memory device 604. Examples of processor 602 include a microprocessor, an application-specific integrated circuit ("ASIC"), a field-programmable gate array ("FPGA"), or other suitable processing device. The processor 602 can include any number of processing devices, including one.

The memory device 604 includes any suitable non-transitory computer-readable medium for storing the image editing application 110, the image file 120, the image directional data 124, the editing tool directional data 130, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 601 may also include a number of external or internal devices such as input or output devices. For example, the computing system 601 is shown with an input/output ("I/O") interface 608 that can receive input from input devices, such as input device 103, or provide output to output devices, such as display device 105. A bus 606 can also be included in the computing system 601. The bus 606 can communicatively couple one or more components of the computing system 601.

The computing system 601 executes program code that configures the processor 602 to perform one or more of the operations described above with respect to FIGS. 1-5. The program code includes operations related to, for example, one or more of the image editing application 110, the image file 120, the image directional data 124, the editing tool directional data 130, or other suitable applications or memory structures that perform one or more operations described herein. The program code may be resident in the memory device 604 or any suitable computer-readable medium and may be executed by the processor 602 or any other suitable processor. In some embodiments, the program code described above, the image editing application 110, the image file 120, the image directional data 124, and the editing tool directional data 130 are stored in the memory device 604, as depicted in FIG. 6. In additional or alternative embodiments, one or more of the image editing application 110, the image file 120, the image directional data 124, the editing tool directional data 130, and the program code described above are stored in one or more memory devices accessible via a data network, such as a memory device accessible via a cloud service.

The computing system 601 depicted in FIG. 6 also includes at least one network interface 610. The network interface 610 includes any device or group of devices suitable for establishing a wired or wireless data connection to one or more data networks 612. Non-limiting examples of the network interface 610 include an Ethernet network adapter, a modem, and/or the like. A remote system 615 and a datastore 690 are connected to the computing system 601 via network 612. In some cases, the remote system 615 can perform some of the operations described herein, such as storing image files or comparing directional data via comparison module 150. In some cases, the datastore 690 can perform some of the operations described herein, such as storing image files or data structures including directional information. In FIG. 6, the computing system 601 is able to communicate with one or more of the remote computing system 615, the comparison module 150, or the datastore 690 using the network interface 610. Although FIG. 6 depicts the comparison module 150 as connected to computing system 601 via the networks 612 and remote system 615, other embodiments are possible, including the comparison module 150 running as a program in the memory 604 of computing device 601.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A method for selectively editing brushstrokes included in a digital graphical image, the method performed by one or more processing devices and comprising:
   receiving a first input indicating a brushstroke on a digital graphical image, the first input further indicating a sequence and locations of multiple pixels included in the brushstroke;
   detecting, based on the sequence and locations of the multiple pixels, a first slope of the brushstroke;
   receiving a second input indicating a motion of an editing tool applied to the digital graphical image;
   detecting a second slope of the motion of the editing tool;

comparing the first slope of the brushstroke to the second slope of the motion of the editing tool to determine a similarity between the first slope and the second slope; and modifying an output of the editing tool based on a similarity of the first slope of the brushstroke and the second slope of the motion of the editing tool.

2. The method of claim 1, further comprising:
detecting a direction of an additional brushstroke on the digital graphical image;
comparing the direction of the additional brushstroke to a direction of the motion of the editing tool;
determining, based on the comparison of the direction of the additional brushstroke to the direction of the motion of the editing tool direction, a dissimilarity between the direction of the additional brushstroke and the direction of the motion of the editing tool; and
providing, based on the dissimilarity, the digital graphical image including the additional brushstroke unmodified by the editing tool.

3. The method of claim 1, further comprising:
generating a vector representation of a direction of the brushstroke;
generating a vector representation of a direction of the motion of the editing tool; and
comparing the vector representation of the direction of the brushstroke to the vector representation of the direction of the motion of the editing tool, wherein the similarity of the direction of the brushstroke and the direction of the motion of the editing tool is based on the comparison of the vector representation of the direction of the brushstroke to the vector representation of the direction of the motion of the editing tool.

4. The method of claim 3, wherein the vector representation of the direction of the brushstroke includes a flow vector for a first pixel of the multiple pixels, the method further comprising:
determining a first location of the first pixel and a second location of a second pixel, wherein the second pixel is subsequent to the first pixel in the sequence of the multiple pixels; and
determining, based on the first location and the second location, a slope between the first pixel and the second pixel and a distance between the first pixel and the second pixel,
wherein the flow vector for the first pixel is generated based on the slope and the distance.

5. The method of claim 3, wherein comparing the vector representation of the direction of the brushstroke to the vector representation of the direction of the motion of the editing tool comprises:
determining a brushstroke flow vector for a first pixel of the multiple pixels;
determining an editing tool flow vector for a corresponding position of the motion of the editing tool, wherein the first pixel has a same location as the corresponding position; and
comparing the brushstroke flow vector for the first pixel and the editing tool flow vector for the corresponding position.

6. The method of claim 1, wherein comparing the first slope of the brushstroke to the second slope of the motion of the editing tool comprises:
comparing an absolute value of the first slope and an absolute value of the second slope.

7. A non-transitory computer-readable medium embodying program code for selectively editing brushstrokes included in a digital graphical image, the program code comprising instructions which, when executed by a processor, cause the processor to perform operations comprising:
receiving a first input indicating a brushstroke on a digital graphical image, the brushstroke comprising multiple pixels;
determining, for a pixel of the multiple pixels, a first slope of the brushstroke;
receiving a second input indicating a motion of an editing tool applied to the digital graphical image, the motion of the editing tool comprising multiple positions on the digital graphical image;
determining, for an editing tool position of the multiple positions, a second slope of the editing tool;
determining that the pixel corresponds to the editing tool position;
comparing the first slope of the brushstroke to the second slope of the motion of the editing tool to determine a similarity between the first slope and the second slope;
determining, based on comparing the first slope of the brushstroke and to the second slope of the motion of the editing tool, that the similarity between the first slope and the second slope is within a threshold similarity; and
modifying, based on the similarity between the first slope of the brushstroke and the second slope of the motion of the editing tool being within the threshold similarity, the pixel based on the editing tool.

8. The non-transitory computer-readable medium of claim 7, the operations further comprising:
determining, for an additional pixel of the multiple pixels, an additional brushstroke;
determining, for an additional editing tool position of the multiple positions, an additional editing tool;
determining that the additional pixel corresponds to the additional editing tool position;
determining, based on a comparison of the additional brushstroke direction and the additional editing tool direction, that the additional brushstroke direction and the additional editing tool are outside the threshold similarity; and
providing, based on the additional brushstroke direction and the additional editing tool direction being outside the threshold similarity, the additional pixel unmodified by the editing tool.

9. The non-transitory computer-readable medium of claim 7, the operations further comprising:
determining, for each additional pixel of the multiple pixels, an additional brushstroke direction; and
determining, for each additional editing tool position of the multiple positions, an additional editing tool direction; and
providing a data structure indicating the additional brushstroke directions.

10. The non-transitory computer-readable medium of claim 9, wherein the data structure further indicates, for each additional pixel, a sequence and a location associated with the each additional pixel.

11. The non-transitory computer-readable medium of claim 9, the operations further comprising generating an additional data structure indicating each direction of each additional editing tool position.

12. The non-transitory computer-readable medium of claim 11, wherein the additional data structure further indicates, for each additional editing tool position, a sequence and a location associated with the each additional editing tool position.

13. A system for editing brushstrokes included in a digital graphical image, the system comprising:
- a means for receiving a first input indicating a brushstroke on a digital graphical image, the first input further indicating a sequence and locations of multiple pixels included in the brushstroke;
- a means for detecting, based on the sequence and locations of the multiple pixels, a direction of the brushstroke;
- a means for generating a vector representation of the direction of the brushstroke;
- a means for receiving a second input indicating a motion of an editing tool applied to the digital graphical image, the second input further indicating a sequence and locations of multiple positions of the motion of the editing tool;
- a means for detecting, based on the sequence and locations of the multiple positions, a direction of the motion of the editing tool;
- a means for generating a vector representation of the direction of the motion of the editing tool;
- a means for determining, based on a comparison of the vector representation of the direction of the brushstroke and the vector representation of the motion of the editing tool, that the direction of the brushstroke and the direction of the motion of the editing tool are within a threshold similarity;
- a means for modifying, based on the direction of the brushstroke and the direction of the motion of the editing tool being within the threshold similarity, the digital graphical image to include the brushstroke modified by the editing tool;
- a means for determining, based on a comparison of an additional brushstroke vector representation of an additional brushstroke to the vector representation of the direction of the motion of the editing tool, that an additional brushstroke of the additional brushstroke and direction of the motion of the editing tool are outside of a threshold similarity; and
- a means for providing, based on the additional brushstroke and the direction of the motion of the editing tool being outside of the threshold similarity, the digital graphical image including the additional brushstroke unmodified by the editing tool.

14. The system of claim 13, wherein the vector representation of the direction of the brushstroke includes a flow vector for a first pixel of the multiple pixels, and the system further comprises:
- a means for determining a sequence and a location of the first pixel and a sequence and a location of a second pixel, wherein the sequence of the second pixel is subsequent to the sequence of the first pixel; and
- a means for determining, based on the sequence and the location of the first pixel and the sequence and the location of a second pixel, a slope between the first pixel and the second pixel and a distance between the first pixel and the second pixel,
- wherein the flow vector for the first pixel is generated based on the slope and the distance.

15. The system of claim 13, wherein the comparison of the vector representation of the direction of the brushstroke and the vector representation of the direction of the motion of the editing tool includes:
- a means for determining a brushstroke flow vector for a particular pixel of the multiple pixels;
- a means for determining an editing tool flow vector for a corresponding position of the multiple positions, wherein the particular pixel has a same location as the corresponding position; and
- a means for comparing the brushstroke flow vector for the particular pixel and the editing tool flow vector for the corresponding position.

16. The system of claim 15, wherein the determination that the direction of the brushstroke and the direction of the motion of the editing tool are within the threshold similarity includes:
- a means for determining a similarity between the brushstroke flow vector for the particular pixel and the editing tool flow vector for the corresponding position.

17. The system of claim 13, wherein the comparison of the vector representation of the brushstroke and the vector representation of the direction of the motion of the editing tool includes:
- a means for determining a first slope of the direction of the brushstroke and determining a second slope of the direction of the motion of the editing tool; and
- a means for comparing a value of the first slope to a value of the second slope.

18. The system of claim 17, wherein the comparison of the vector representation of the direction of the brushstroke and the vector representation of the direction of the motion of the editing tool further includes:
- a means for comparing an absolute value of the first slope and an absolute value of the second slope.

19. The method of claim 1, wherein detecting the first slope of the brushstroke comprises:
- reading stored directional data indicating a respective direction of the brushstroke at each pixel of the multiple pixels included in the brushstroke.

* * * * *